United States Patent
Hashem et al.

(10) Patent No.: US 7,225,367 B2
(45) Date of Patent: May 29, 2007

(54) METHOD AND SYSTEM FOR TRACKING ERRORS

(75) Inventors: Tony Hashem, Lynchburg, VA (US); Keri A. Quinn, Bedford, VA (US); Jennifer Dorothy Vecchio, Rustburg, VA (US); Ashwin Parmar, Lynchburg, VA (US); Timothy Adam Hilton, Lynchburg, VA (US)

(73) Assignee: Genworth Financial, Inc., Richmond, VA (US)

( * ) Notice: Subject to any disclaimer, the term of this patent is extended or adjusted under 35 U.S.C. 154(b) by 1009 days.

(21) Appl. No.: 09/933,768

(22) Filed: Aug. 22, 2001

(65) Prior Publication Data

US 2003/0041291 A1    Feb. 27, 2003

(51) Int. Cl.
*G06F 11/00* (2006.01)
(52) U.S. Cl. .............. 714/48; 714/57; 714/46; 379/9.03; 379/9.04
(58) Field of Classification Search ............ 714/46, 714/48, 57, 25, 26; 379/9.03, 9.04; 382/309
See application file for complete search history.

(56) References Cited

U.S. PATENT DOCUMENTS

| | | | | |
|---|---|---|---|---|
| 5,483,637 A | * | 1/1996 | Winokur et al. ........... 714/26 |
| 5,790,779 A | * | 8/1998 | Ben-Natan et al. ........... 714/39 |
| 6,028,970 A | * | 2/2000 | DiPiazza et al. ............ 382/309 |
| 6,029,258 A | * | 2/2000 | Ahmad ....................... 714/46 |
| 6,032,184 A | * | 2/2000 | Cogger et al. .............. 709/223 |
| 6,230,287 B1 | * | 5/2001 | Pinard et al. ................. 714/31 |
| 6,449,341 B1 | * | 9/2002 | Adams et al. ................. 379/9 |
| 6,516,055 B1 | * | 2/2003 | Bedeski et al. .......... 379/32.01 |
| 6,772,374 B2 | * | 8/2004 | Forman et al. ............... 714/46 |
| 6,829,734 B1 | * | 12/2004 | Kreulen et al. .............. 714/46 |

OTHER PUBLICATIONS

Microsoft Press Computer Dictionary, 1997, Microsoft Press, Third Edition, p. 173.*

* cited by examiner

*Primary Examiner*—Robert Beausoliel
*Assistant Examiner*—Marc Duncan
(74) *Attorney, Agent, or Firm*—Hunton & Williams

(57) ABSTRACT

The invention includes a system and method for tracking errors, the system residing on a user's desktop communicating with a central database over a network. The system comprises an error log including error recording tools for enabling the user to record an error; error resolution tools for enabling the user to resolve the error; and error follow-up tools for enabling a user to follow up on resolved errors; error reporting tools for enabling a user to generate error reports from the user's desktop; and communication tools for enabling the user to transmit logged errors to the central database and to receive reports generate from errors logged in the central database.

11 Claims, 6 Drawing Sheets

METHOD AND SYSTEM FOR TRACKING ERRORS

FIELD OF THE INVENTION

The present application relates to a system and method for tracking errors and more particularly to a system and method for tracking and resolving errors in a document.

BACKGROUND OF THE INVENTION

In recent years, many businesses have moved from a traditional paper-based document handling and delivery system to an image-based document handling and delivery system. In image-based document delivery systems, a paper document is converted to an electronic image, and once the document is converted to an image by a scanner or similar equipment, the document can be transmitted and manipulated electronically in image form without being converted back to a paper document. One such image based delivery system is described in co-pending patent application Ser. No. 09/620,563 filed on Jul. 20, 2000, which is hereby incorporated by reference. The image-based delivery system described in the aforementioned application has many advantages over traditional paper-based document handling and delivery systems including: (1) improved business cycle time because time-consuming traditional mail/courier services are no longer used or are used less frequently; (2) reduced mail/courier costs; and (3) fewer resources are required.

Despite the many advantages that arise from the use of an image-based document handling and delivery system, difficulties arise due to errors that occur during scanning and other document conversion processes. Image based documents may often contain conversion errors that cause them to be inconsistent with the original paper-based documents. Some of the errors may be recurring errors that could be eliminated during or after document conversion if the occurrence of such errors were accurately predicted and tracked. Often, imaged documents are illegible, have missing pages, or include blank portions due to post-it notes covering portions of the text. Errors can also include processing details such as imaging a document using an incorrect work-type or incorrect indexing. In addition, some documents are incorrectly completed such as an unsigned application or check or missing alternation forms.

In view of the potential deficiencies described above in image-based document handling and delivery systems, a system is needed for efficiently and economically tracking errors found in documents formed by an imaging process.

SUMMARY OF THE INVENTION

In accordance with the purposes of the invention as embodied and broadly described herein, there is provided a system for tracking errors. The system may reside on a user's desktop and communicate with a central database over a network. The system comprises an error log including error recording tools for enabling the user to record an error; error resolution tools for enabling the user to resolve the error; and error follow-up tools for enabling the user to follow up on an error. The system additionally includes error reporting tools for enabling the user to generate error reports from the user's desktop and communication tools for enabling the user to transmit logged errors to the central database and to receive reports generated based on errors logged in the central database.

In an additional aspect, the invention comprises a method for enabling a user to log errors that occurred during a process. The method comprises the steps of: finding an error; selecting an error log icon; entering policy details on an error log screen; entering personal details on the error log screen; entering error details on the error log screen; and determining whether assistance is needed to correct the error. The method further comprises completing resolution details and saving changes if assistance is not necessary; entering recipient details if assistance is necessary and sending an email message to a selected recipient; and finally saving error data in an error log database.

In yet a further aspect of the invention, a method is disclosed for resolving an error logged through an error tracking system. The method comprises the steps of: locating an error that requires resolution; opening an error log application; locating an error incident number; opening an error incident as indexed by the error incident number and entering resolution details; closing the error incident; and storing the error resolution details in an error log database.

These and other features, objects, and advantages of the preferred embodiments will become apparent when the detailed description of the preferred embodiments is read in conjunction with the drawings attached hereto.

BRIEF DESCRIPTION OF THE DRAWINGS

The present invention can be understood more completely by reading the following Detailed Description of exemplary embodiments, in conjunction with the accompanying drawings, in which.

DETAILED DESCRIPTION OF THE PREFERRED EMBODIMENT

Figure 1:
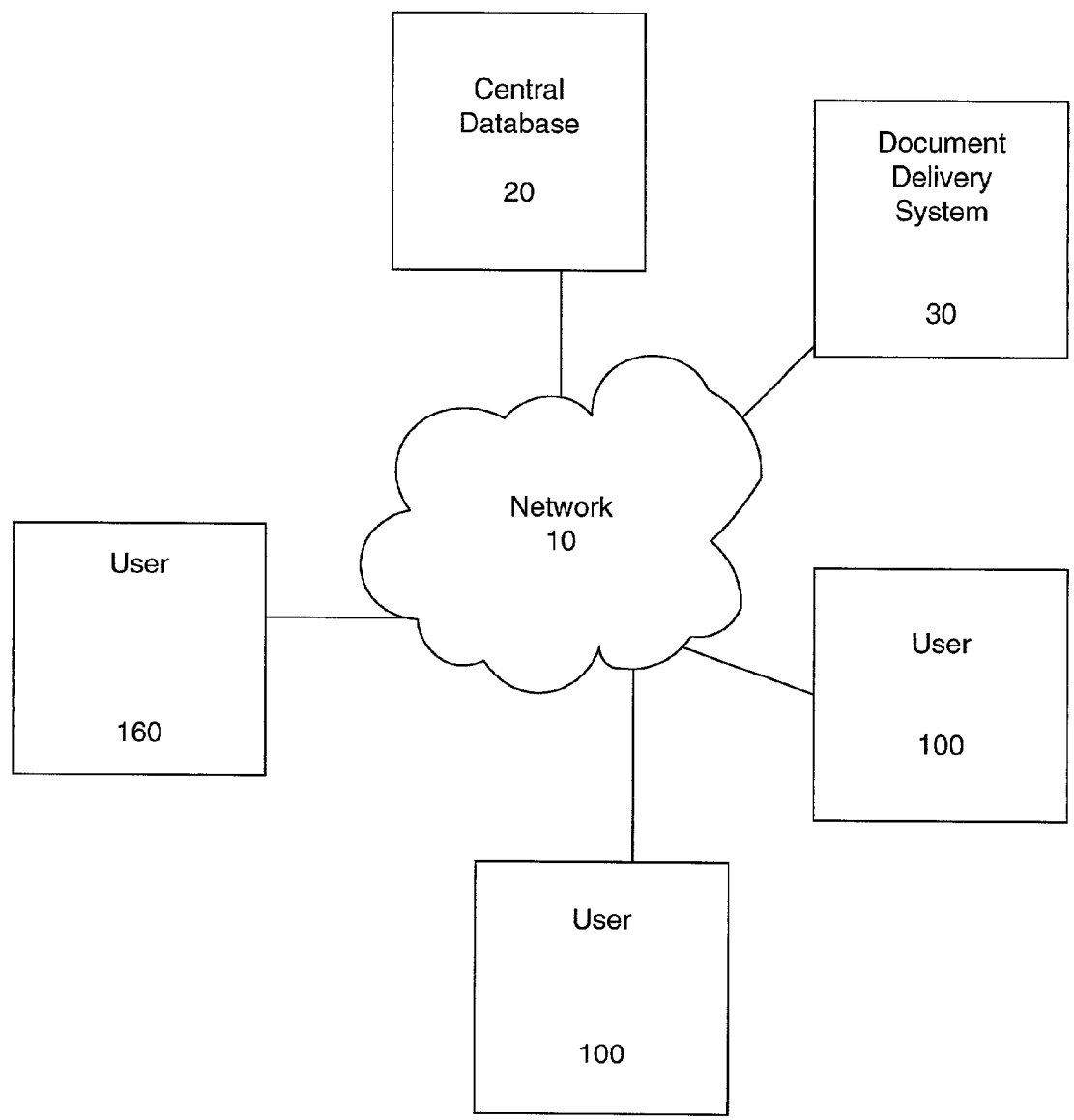
FIG. 1 is a block diagram showing an embodiment of the error logging and tracking system of the invention.

Reference will now be made in detail to the present preferred embodiments of the invention, examples of which are illustrated in the accompanying drawings in which like reference numerals refer to corresponding elements.

FIG. 1 is a block diagram illustrating an implementation of an error logging system of the invention. The error logging system may operate on any type of document including but not limited to the types of documents contained in a JPG, MP3, Tiff, EXE or any other type of file. A document delivery system 30 delivers documents over a network 10 to one or more of a plurality of users 100. When logging errors, the users 100 are able to send error data over the network 10 to a central database 20.

The document handling and delivery system 30 may be any document delivery system and may in particular include a system such as the image-based document handling and delivery system disclosed in co-pending patent application Ser. No. 09/620,563.

Upon receiving a document from the document delivery system 30, the user or user device 100 is able to log errors occurring in a document when the user 100 is reviewing the document. The user device 100 preferably comprises a computer. The computer may comprise any known type of computer and may operate using any one of a variety of operating programs such as the Microsoft Windows™ 98 programs. The system for logging and tracking errors, which is shown in greater detail in FIG. 2, resides on the user device.

The user device 100 is communicatively coupled to other computers such as the document handling and delivery system 30 and the central database system 20 via the network 10. The network 10 can be formed as an intranet, a PAN (Personal Area Network), a LAN (Local Area Network), a WAN (Wide Area Network), a MAN (Metropolitan Area Network) or other type of network. The network 10 may alternatively use wireless technology to connect computers together. The user devices 100 may also communicate with the Internet via an Internet service provider. The network 10 may operate using any network-enabled code, such as Hyper Text Markup Language (HTML), Dynamic HTML, Extensible Markup Language (XML), Extensible style sheet and Specification Language (DSSSL), Java™, etc.

The database 20 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

Figure 2:
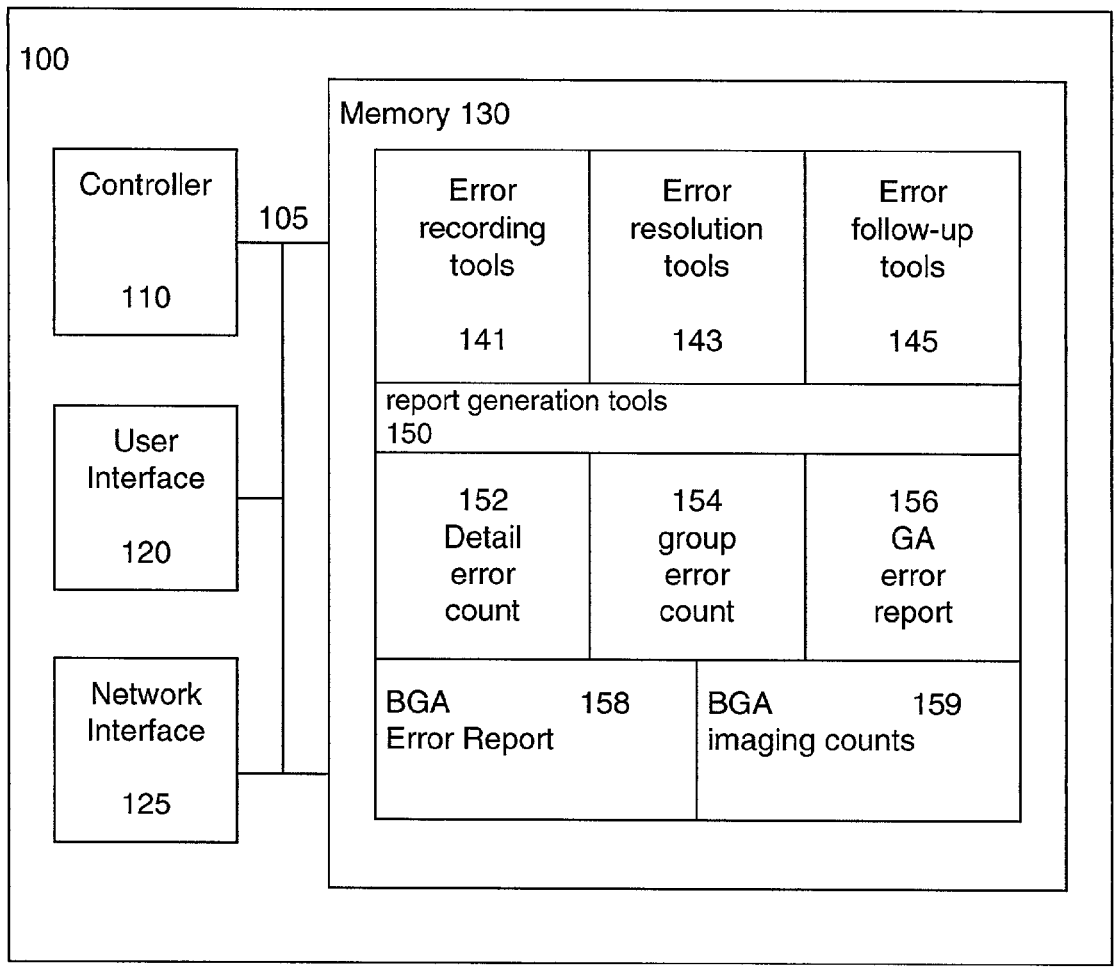
FIG. 2 is a block diagram showing an embodiment of the error log components residing on a user device of the invention.

With further reference to FIG. 2, the user device 100 includes a controller 110, a user interface 120, a network interface 125, and a memory 130. The controller 110 may be connected to the memory 130 via a bus 105. The memory 130 may comprise a RAM, a ROM, and other types of storage data such as a CDROM or other optical storage.

The memory 110 includes tools necessary for logging and resolving errors. The tools include error reporting tools 141, error resolution tools 143, error follow-up tools 145, and report generation tools 150. The report generation tools 150 include detail error count reporting tools 152, group error count reporting tools 154, general agent (GA) error reporting tools 156, brokerage general agency (BGA) error reporting tools 158, and BGA imaging count reporting tools 159. Each of the aforementioned tools is described in greater detail below.

The error reporting tools 150 offer customized reports to the user 100. The detail error count tools 152 provide the user with the number of times a particular type of error occurred during a time period indicated by the user for an imaging office indicated by the user 100. The errors with a high incidence of occurrence may indicate that additional training is necessary in particular areas. High volumes of certain types of errors may indicated that scanning equipment should be cleaned more often.

The group error count reporting tools 154 can provide the user 100 with a volume of errors found along a particular point in quality review.

The GA error reporting tools 156 provide the user with a log listing of each error reported for a particular BGA, for all BGAs or to a particular recipient such as to an image resolution request mailbox. The necessary data may be pulled from the central database 20 based on a GA number which is entered by the user 100 as described below or by the email recipient as entered by the user on the error log screen as more fully described below.

The BGA error reporting tools 158 provide a type of report similar to that of the GA error reporting tools 156 except that the user 100 has the option of running the report based on the BGA name in addition to by the recipient indicated in the email routing field. This report is useful because one BGA may have multiple GA numbers. The user 100 can generate one report that contains all the brokerage agency's GA numbers.

The BGA imaging count reporting tools 159 provide the user 100 with a report including the number of documents a particular provider or brokerage agency delivered through an imaging process during a specified time period. This report allows the imaging quality of various imaging sites to be compared with one another.

The user 100 accesses the error reporting tools 141 through clicking on an error log icon available through the user interface 120. In a preferred embodiment, the icon will be provided to all users 100 within an organization 100 that review documents as a function of their jobs. Although the documents may be delivered by an internal document delivery system 30 as shown above, the documents may also be delivered from an outside agency.

Figure 3:
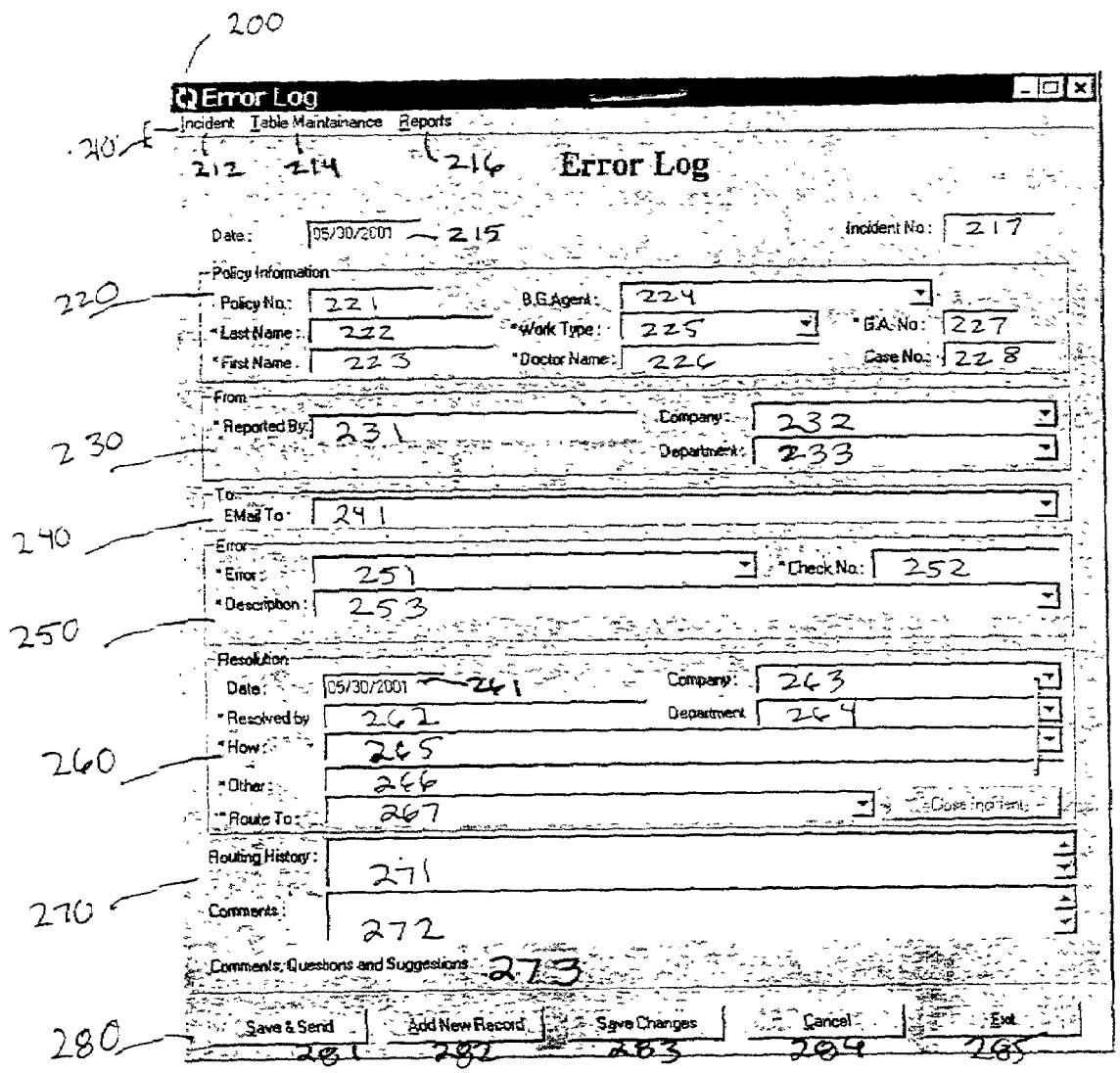
FIG. 3 is a block diagram showing an embodiment of the error log screen available on a user device of the invention.

When a user 100 accesses the error reporting tools 141, the user 100 is presented with an error log screen 200 as shown in FIG. 3. Using this screen 200, the user 100 can report any errors found within the document. The error log screen 200 includes a menu bar 210 that includes an incident heading 212, a table maintenance heading 214, and a reports heading 216. The incident heading 212 enables a user 100 to search by query or incident number. The table maintenance heading 214 enables a log administrator to add, modify, or delete any list box. The reports heading 216 allows for stock and customized reports and allows access to image counts from an appropriate database. The error log screen 200 further includes a date entry blank 215 and an incident number entry blank 217.

A policy information block 220 is present in an embodiment of the invention and includes a policy number blank 221, a last name blank 222, a first name blank 223, a BGA agent blank 224, a work type blank 225, a doctor name blank 226, a GA number blank 227, and a case number blank 228. The BOA agent blank 224 may list all of tho applicable brokerage agencies and may be updated using table maintenance. Adjacent the GA number blank 227 is an asterisks that indicates that the field is required to log the incident. The policy information block 220 is relevant to applications in which the documents being reviewed are insurance documents.

A "From" box 230 includes a name blank 231 for the user 100 to enter his name. By tracking who reported the error, management can determine where the quality assurance checks were most productive or where additional training is required. The "From" box 230 further includes a company name blank 232, and a department name blank 233. The "from" box 230 records the identity of the person who logged the error.

A routing box 240 includes an email address blank 241. The user 100 can type in the address of a party capable of correcting the error that the user has located in the email address blank 241. The email address blank 241 may include pre-formatted and identified error recipients within or outside of the organization. Alternatively, free-form email addresses may be entered.

An error box 250 includes an error blank 251, a check number blank 252, and a description blank 253. Error box 250 is the box in which the user records the error. In the error blank 251, the user enters the error and details. In the check number box 252, the user enters an applicable number. In the description box 253, a description menu is presented based on the information entered in the error blank 251. The user 100 may then select a description from the menu presented.

A resolution box 260 includes a date blank 261, a "resolved by" blank 262, a company blank 263, a department blank 264, a how blank 265, an "other" blank 266, a "route to" blank 267. The user 100 or anyone who subsequently resolves the error completes the information in the resolution box 260.

A history box 270 includes a routing history blank 271, a comments blank 272, and a comments, questions, or suggestions line 273. The routing history may be automatically updated and cannot be modified. Keeping track of the routing history helps to identify where in the resolution process any delays occurred. Comments may be added to the comments blank 272 during any stage of the reporting, resolution, or follow-up process. By clicking on the comments, questions, or suggestions line 273, the user can email the log administrator.

Action buttons 280 include a save and send button 281, an add new record button 282, a save changes button 283, a cancel button 284, and an exit button 285.

Using the above-described system, a user can generate customized reports and can perform three basic processes with respect to errors including recording an error, resolving an error, and following up on an error. The flow charts of FIGS. 4–6 show the details of each of these processes.

Figure 4:
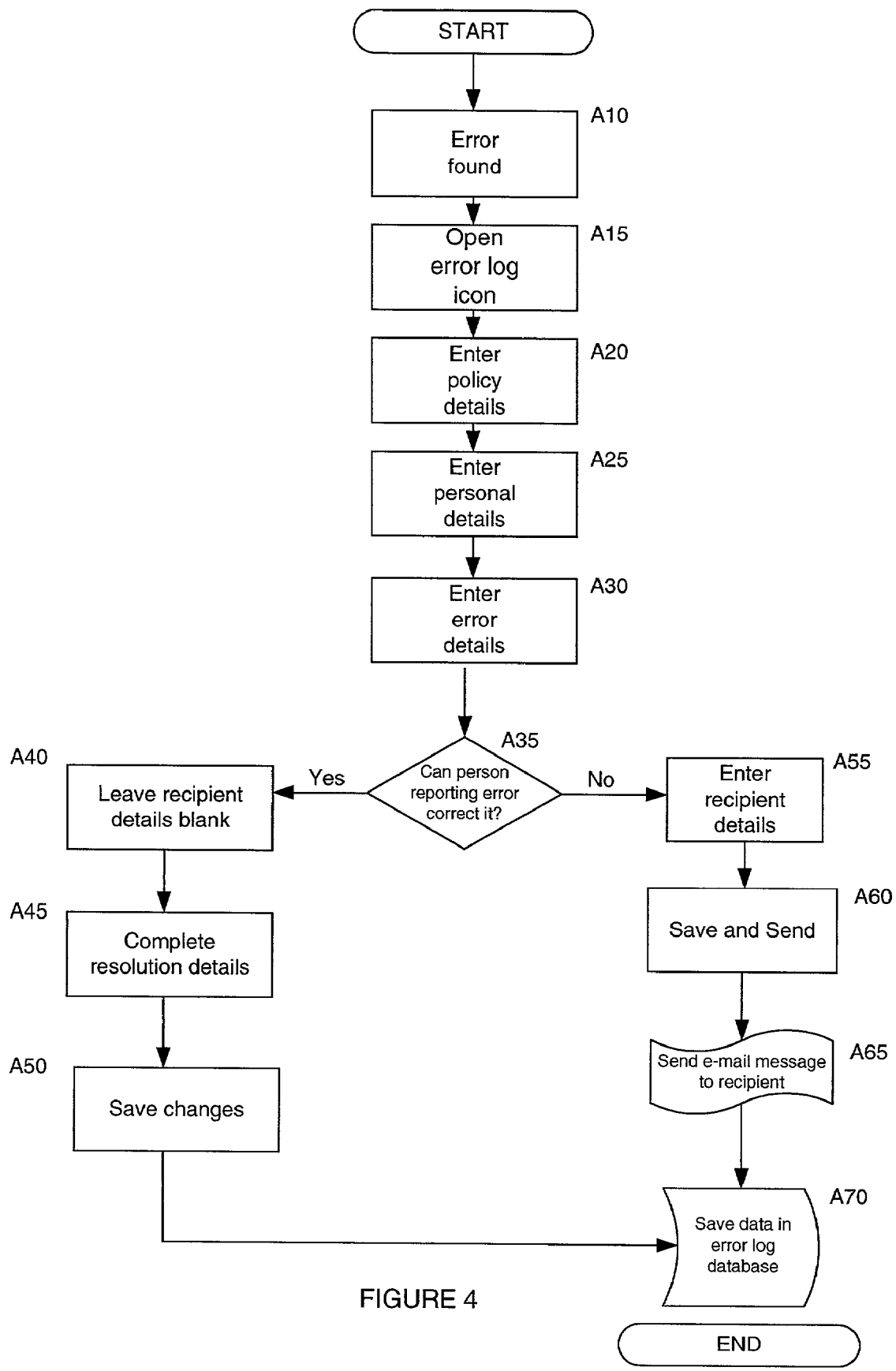
FIG. 4 is a flow chart showing an embodiment of a method for logging errors.

FIG. 4 is a flow chart showing the steps involved when a user reports an error. In step A10, a user locates an error in a document. In step A15, the user opens the error log icon. In step A20, the user enters details pertaining to the nature of the document. In an embodiment of the invention, in step A20, the user enters policy details for an insurance policy including such data as a policy number, an agent, first and last names, case number, and doctor name. In step A25, the user enters personal details in the "from" box 230, such as name, company, and department. In step A30, the user enters error details in error box 250, such as an error, an error description and a check number. In step A35, the user determines whether or not he can correct the error himself. If the user cannot correct the error himself, the user enters recipient details in step A55 such as the recipient's email address. In step A60, the user saves and sends the message, which is transmitted in step A65. The data is saved in the database 20 in step A70. If the user can resolve the error in step A35, the user leaves the recipient details blank in step A40 and completes the resolution details in step A45. The user saves the changes in step A50.

Figure 5:
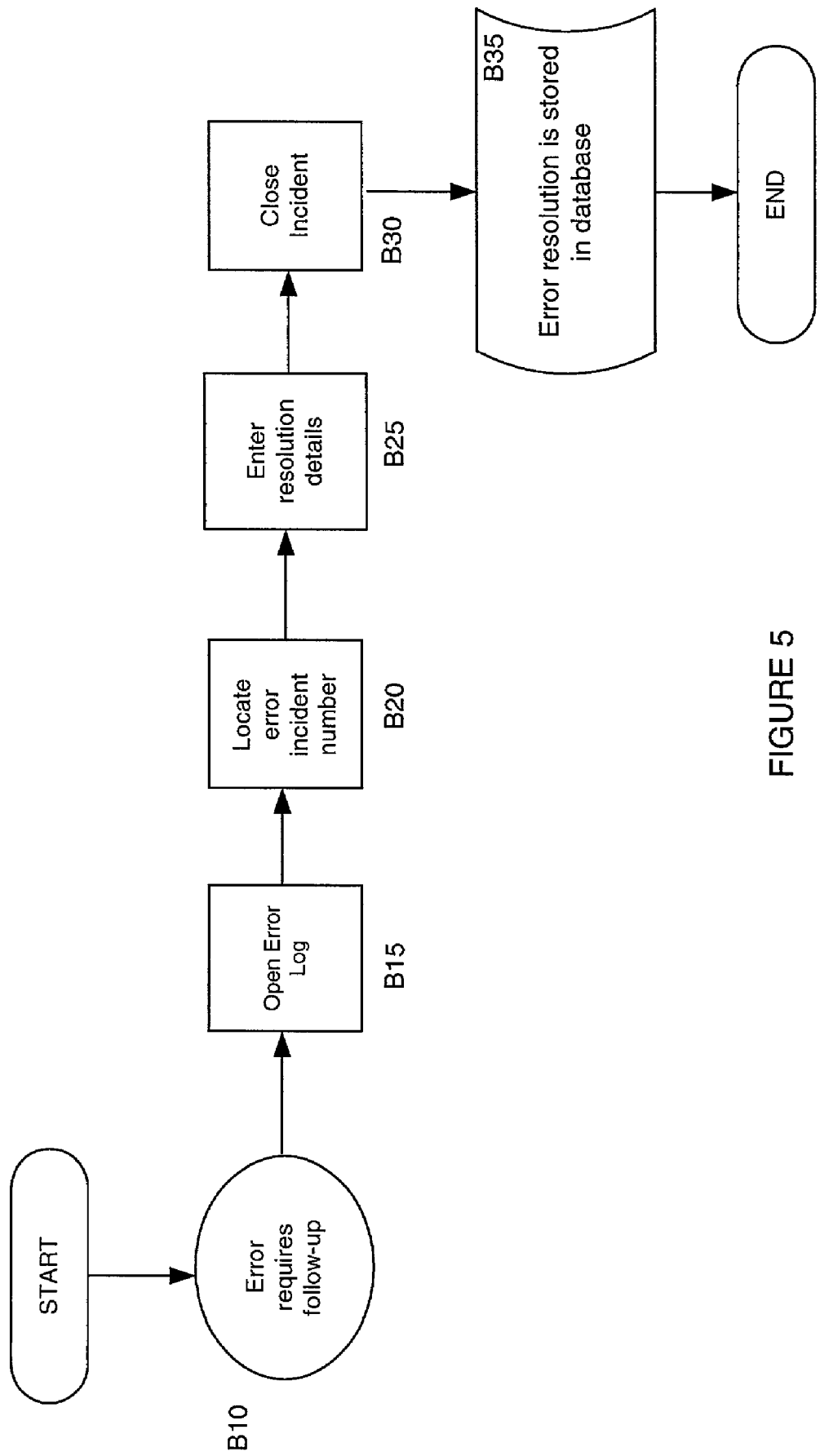
FIG. 5 is a flow chart showing an embodiment of a method for resolving errors.

FIG. 5 is a flow chart illustrating the steps involved in the error resolution process. In step B10 the user locates an error that requires follow-up. In step B15, the user opens the error log interface. In step B20, the user locates the error incident number. In step B25, the user enters error resolution details. In step B30, the user closes the error incident. In step B35, the error resolution is stored in the database 20.

Figure 6:
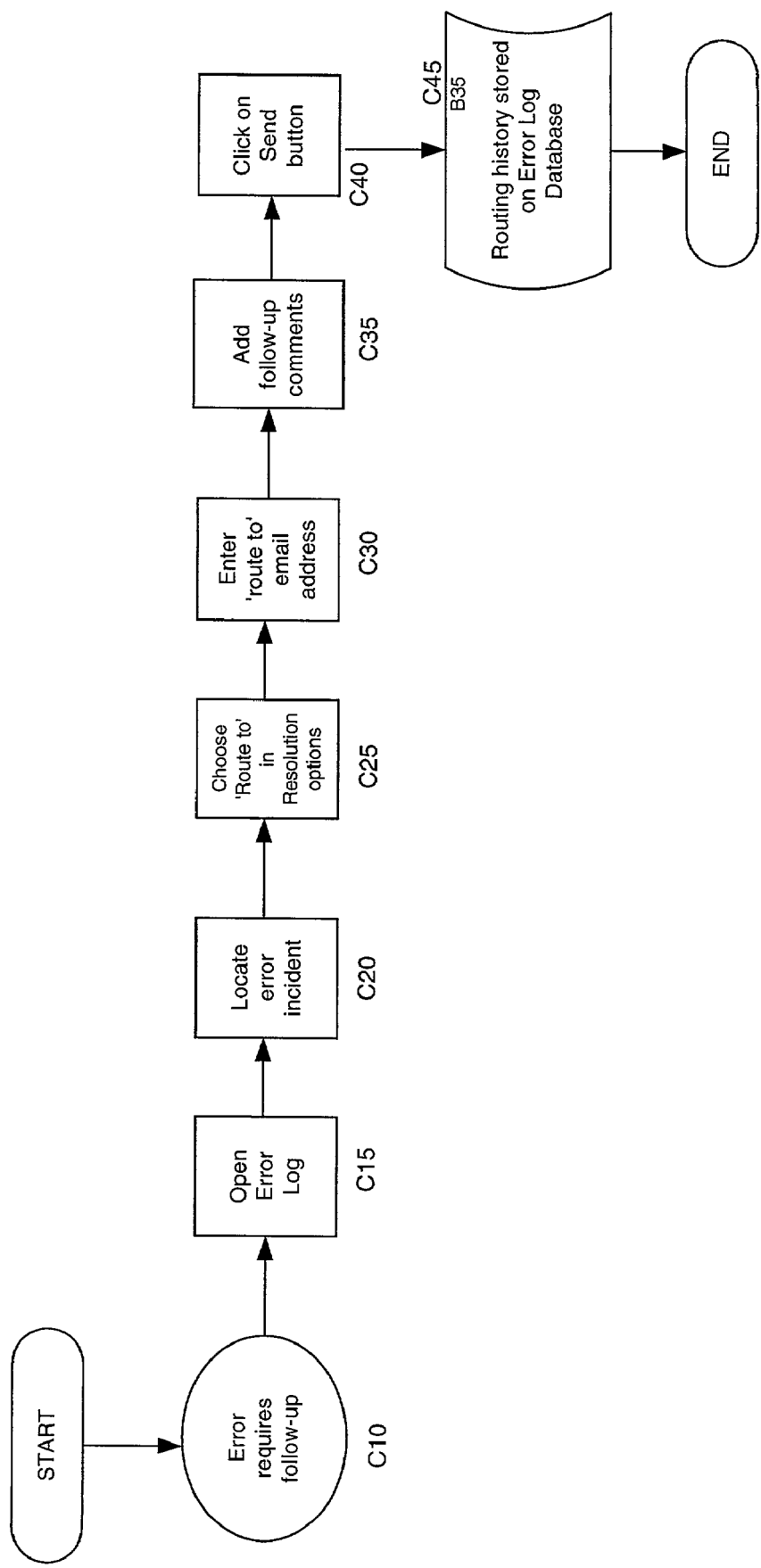
FIG. 6 is a flow chart showing an embodiment of a method for following up on unresolved errors.

FIG. 6 illustrates the steps involved when a user realizes that he cannot resolve an error an therefore must follow up by routing the error incident to an appropriate party. In step C10, the user locates an error that requires follow-up. In step C15, the user opens the error log interface. In step C20, the user locates the error incident. In step C25, the user choices the "route to" option from the error resolution options. In step C30, the user enters the email address of the receiving party. In step C35, the user adds follow-up comments. In step C40, the user clicks on the send button. In step C45, the routing history is stored on the error log database 20.

The system for tracking occurs ensures that all errors that occur in a process will be recorded and that the recorded information can be accessed via customized reports. The error tracking system helps to identify weaknesses and strengths within the process by monitoring the internal process and identifying training gaps. When used in the insurance industry, the error tracking process is effective for monitoring the BGA's quality and for providing feedback to internal and external customers.

The system for tracking errors, while designed for tracking errors that occur during an imaging process, maintains the functionality to track errors in a variety of processes. For instance, the system could be used to track policy assembly errors, case manager issues, and settlement audits. Furthermore, although the error tracking system is described specifically in conjunction with insurance company usage, any company with an imaging or scanning process could benefit from the system.

It will be apparent to those skilled in the art that various modifications and variations can be made in the system and method of the present invention without departing from the spirit and scope of the invention. Thus, it is intended that the present invention cover the modifications and variations of this invention provided that they come within the scope of the appended claims and their equivalents.

What is claimed is:

1. A method enabling a user to log errors that occurred during a process, the method comprising the steps of:
finding an error, wherein finding an error comprises finding the error in an imaged document, the error comprising one of a missing page, a missing portion, and an unsigned document;
selecting an error log icon;
entering document details, wherein entering document details comprises entering policy details such as a policy number;
entering personal details;
entering error details;
determining whether assistance is needed to correct the error;
completing resolution details and saving changes if assistance is not necessary;
entering recipient details if assistance is necessary and sending an email message to a selected recipient; and
saving error data in an error log database.

2. The method of claim 1, wherein the policy details includes a policy number.

3. The method of claim 1, wherein the step of entering personal details comprises entering at least one of a name, a department, and a company reporting the error.

4. The method of claim 1, wherein the step of entering error details comprises entering an error and entering an error description.

5. The method of claim 1, wherein completing resolution details comprises entering a name of a resolving party and entering a method of resolution.

6. The method of claim 1, wherein entering recipient details comprises entering a selected recipient capable of resolving the error.

7. A method for resolving an error logged through an error log system, the method comprising the steps of:
locating an error that requires resolution, wherein locating an error comprises locating the error while reviewing a document;
opening the error log;

locating an error incident number, wherein the error incident number is associated with a policy number;

entering resolution details;

closing the incident;

generating error resolution data based on the resolution details; and storing the error resolution data in a computer-implemented error log database.

8. The method of claim 7, wherein the step of locating an error that requires resolution comprises receiving a routed error.

9. The method of claim 7, wherein the step of opening the error log comprises selecting an error log icon on a user device.

10. The method of claim 7, wherein the step of entering resolution details comprises entering a resolving party name and a method of resolution.

11. A method enabling a user to log errors that occurred during a process, the method comprising the steps of:

finding an error;

selecting an error log icon;

entering document derails, wherein entering document details comprises entering policy details such as a policy number;

entering personal details;

entering error details;

determining whether assistance is needed to correct the error;

completing resolution details and saving changes if assistance is not necessary;

entering recipient details if assistance is necessary and sending an email message to a selected recipient; and saving error data in an error log database.

\* \* \* \* \*